US009374941B2

(12) United States Patent
Olszewski (10) Patent No.: US 9,374,941 B2
(45) Date of Patent: Jun. 28, 2016

(54) SIEVED COMPOST AND HYDROGEL-BASED METHOD AND COMPOSITION FOR SEED PRIMING

(75) Inventor: Michael W. Olszewski, Abington, PA (US)

(73) Assignee: TEMPLE UNIVERSITY -OF THE COMMON-, Philadelphia, PA (US)

( * ) Notice: Subject to any disclaimer, the term of this patent is extended or adjusted under 35 U.S.C. 154(b) by 51 days.

(21) Appl. No.: 14/342,626

(22) PCT Filed: Sep. 12, 2012

(86) PCT No.: PCT/US2012/054800
§ 371 (c)(1),
(2), (4) Date: Mar. 21, 2014

(87) PCT Pub. No.: WO2013/039997
PCT Pub. Date: Mar. 21, 2013

(65) Prior Publication Data
US 2014/0216116 A1 Aug. 7, 2014

Related U.S. Application Data

(60) Provisional application No. 61/533,473, filed on Sep. 12, 2011.

(51) Int. Cl.
*A01N 25/26* (2006.01)
*A01C 1/06* (2006.01)
*A01C 1/02* (2006.01)

(52) U.S. Cl.
CPC .... *A01C 1/06* (2013.01); *A01C 1/02* (2013.01)

(58) Field of Classification Search
None
See application file for complete search history.

(56) References Cited

U.S. PATENT DOCUMENTS

| | | | |
|---|---|---|---|
| 2,625,471 A * | 1/1953 | Mowry et al. | 71/1 |
| 4,034,508 A | 7/1977 | Dedolph | |
| 4,779,376 A | 10/1988 | Redenbaugh | |
| 4,912,874 A | 4/1990 | Taylor | |
| 5,300,127 A * | 4/1994 | Williams | 47/57.6 |
| 5,628,144 A | 5/1997 | Eastin | |
| 5,910,050 A | 6/1999 | Eastin | |
| 5,927,003 A * | 7/1999 | Miller et al. | 47/1.01 R |
| 5,974,734 A | 11/1999 | Eastin | |
| 6,180,562 B1 * | 1/2001 | Blum | 504/117 |
| 6,200,609 B1 | 3/2001 | Klimaszewska et al. | |
| 6,200,809 B1 * | 3/2001 | Klimaszewska et al. | 435/422 |
| 6,557,298 B2 | 5/2003 | Obert et al. | |
| 6,646,181 B1 | 11/2003 | Eastin | |
| 7,587,856 B2 * | 9/2009 | Rubin et al. | 47/1.01 R |
| 2002/0026659 A1 | 2/2002 | Blowers et al. | |
| 2004/0045217 A1 | 3/2004 | Chiddick et al. | |
| 2008/0236037 A1 | 10/2008 | Rose et al. | |
| 2010/0130365 A1 | 5/2010 | Notten et al. | |

OTHER PUBLICATIONS

Afzal et al, "Effect of Different Seed Vigour Enhancement Techniques on Hybrid Maize (*Zea mays* L.)" Pak. J. Agri Sci. 39(2): 109-112 (2002).
Afzal et al, "Enhancement of Germination and Emergence of Canola Seeds by Different Priming Techniques" Cademo de Pasquisa Sėr. Bio., Santa Cruz do Sui, 16(1):19-34 (2004).
Arin et al, "Effects of different osmotic solutions on onion seed emergence" African Journal of Agricultural Research 6(4):986-991 (Feb. 18, 2011).
Ashraf et al, Pre-Sowing Seed Treatment—A Shotgun Approach to Improve Germination, Plant Growth, and Crop Yield Under Saline and Non-Saline Conditions Advances in Agronomy 88:223-271 (2005).
Azam et al "Effect of Sowing Date, Irrigation and Plant Densities on Radiation Interception and its Utilization Efficiency in Lentils" International Journal of Agriculture & Biology, 4(2):217-219 (2002).
Bijanzadeh et al, Influence of seed priming techniques on germination and emergence of rapeseed (*Brassica napus* L.) Seed Science and Technology, 38(1):242-247 (2010).
Blodgett et al, "Growth and Shelf Life of Impatiens in Media Amended with Hydrophilic Polymer and Wetting Agent" HortTechnology, 5(1):38-40 (1995).
Brainard et al, "Final Report: Improving carrot quality and yield through strip-tillage and enhanced carrot stand establishment" Department of Horticultural, Michigan State University (Jun. 13, 2011).
El-Hady et al, "Conditioning Effect of Composts and Acrylamide Hydrogels on a Sandy Calcareous Soil. II-Physico-bio-chemical Properties of the Soil" Int. J Agri. Biol. 8(6):876-884 (2006).
El-Hady et al, "Sand-Compost-Hydrogel Mix for Low Cost Production of Tomato Seedlings" Egyptian Journal of Soil Science 42(4):767-782 (2002).
European Bioremediation "Trichoderma" IPM Magazine (2006) http://ghort.ni/information/Tricho.php.
Fonteno et al, "Impact of Hydrogel on Physical Properties of Coarse-structured Horticultural Substrates" J. Amer. Soc. Hort. Sci. 118(2):217-222 (1993).
Ilyas, Matriconditioning improves Thermotolerance in Pepper Seeds through Increased in 1-Aminocyclopropane-1-Carboxylic Acid Synthesis and Utilization. Hayati, Maret 2006, 13(1):13-18 (Feb. 3, 2006).
Olszewski, et al, 'Effects of Peat Moss Substitution with Arboretum and Greenhouse Waste Compost for Use in Container Media' Compost Science & Utilization, 17(3):151-157 (2009).

(Continued)

*Primary Examiner* — Alton Pryor
(74) *Attorney, Agent, or Firm* — Drinker Biddle & Reath LLP (57) ABSTRACT

Provided is a method for seed priming comprising the steps of treating seed with a seed priming composition comprising sieved compost, hydrogel and water in a ratio of sieved compost:hydrogel:water of from about 5:1:4.75 to about 9:1:11 by weight in an amount sufficient to result in priming of the seed. In some embodiments, the seed is treated with from about 2 to about 39 grams of the seed priming composition per gram of seed. In preferred embodiments, the seed composition and the seed priming composition are free of soil or sand. In further preferred embodiments, the seed is blended with the seed priming composition at a temperature of about 5° C. to about 25° C.

17 Claims, 1 Drawing Sheet

(56) References Cited

OTHER PUBLICATIONS

Olszewski et al, "Use of Sieved Compost Plus Hydrogel for Solid Matrix Priming of Native Wildflower Seeds" Supplement to HortScience, 46(9):S311, (Sep. 25-28, 2011).

Taban et al, "Effect of Aquasorb and Organic Compost Amendments on Soil Water Retention and Evaporation with Different Evaporation Potentials and Soil Textures" Communications in Soil Science and Plant Analysis, 37:2031-2055 (2006).

Wang et al, "Hydrophilic Polymers—Their Response to Soil Amendments and Effect on Properties of a Soilless Potting Mix" J. Amer. Soc. Hort. Sci. 115(6):943-948 (1990).

Yamamoto et al, "Field emergence of solid matrix seed primed turfgrasses" Crop Science (Jan. 1, 1997).

* cited by examiner

SIEVED COMPOST AND HYDROGEL-BASED METHOD AND COMPOSITION FOR SEED PRIMING

CROSS-REFERENCE TO RELATED APPLICATION

The benefit of the filing date of U.S. Provisional Patent Application No. 61/533,473, filed Sep. 12, 2011, is hereby claimed. The entire disclosure of the aforesaid application is incorporated herein by reference.

FIELD OF THE INVENTION

The present invention relates to a sieved compost and hydrogel-based seed priming composition and method.

BACKGROUND OF THE INVENTION

Priming allows seed germination processes to begin by partially hydrating seed but at sufficiently low water potentials such that radicle emergence does not occur; seed are typically dried-back to their dry state after the procedure. Specialized priming techniques may include hydropriming, halopriming, osmopriming, biopriming, and solid matrix priming (Ashraf, M. and M. R. Foolad. 2005. In: *Advances in Agronomy*. D. L. Sparks ed. vol. 88. pp 223-251. Elsevier Academic Press. San Diego, Calif.). Seed physiological improvement following priming may be due to advanced embryo growth, breakdown of endosperm tissue, and synthesis of beneficial macromolecules (reviews by Ashraf, M. and M. R. Foolad. 2005. In: Advances in Agronomy. D. L. Sparks ed. vol. 88. pp 223-251. Elsevier Academic Press. San Diego, Calif.; Khan, A. A. 1992. *Hort. Rev.* 13:131-181). Osmotic priming subjects seeds to low osmotic potential at a specific temperature and duration and has been shown to increase germination rate, emergence, and/or stand size and uniformity of carrot (Brocklehurst, P. A. and J. Dearman. 1983. *Ann. Appl. Biol.* 102:577-584; Haigh, A. M. and E. W. R. Barlow. 1987. *J Amer. Soc. Hort. Sci.* 112:202-208; Pill, W. G. and T. A. Evans. 1991. *J Hort. Sci.* 66:67-74; Pill, W. G. and W. E. Finch-Savage. 1988. *Ann. Appl. Biol.* 113:383-389; Szafirowska, A., A. A. Khan, and N. H. Peck. 1981. *Agron. J.* 73:845-848). Osmotic priming employs chemicals (polyethylene glycol or salt solutions).

Solid matrix priming involves suspending seeds in a defined solid (matrix) of known matric potential to control seed water intake. The solid can be organic, inorganic or both. The seed and matrix compete for available water in a controlled aeration and defined temperature environment for a prescribed priming period. (S. M. Hock, S. Z. Knezevic, C. L. Petersen, J. Eastin and A. R. Martin. 2006. *Weed Technology* 20(2):530-534) Commercial priming carriers for solid matrix priming include Zonolite® (vermiculite, Grace Construction Products), vermiculite #5 and Celite® Micro-Cel E (calcium silicate, $CaSiO_3$). Peat moss, sand, bituminous soft coal, Leonardite shale, and calcined clay are also solid carriers that can potentially be used for priming. Current solid carriers for solid matrix priming must be mined from specific sources and refined prior to use. Other organic materials used in priming such as peat moss have high carbon contents, must be mined or harvested from environmentally sensitive areas and must be shipped significant distances and be processed before use. Priming subjects seeds to sufficiently low matric potential such that radicle emergence is prevented but physiological processes are initiated.

There remains a need for effective, low-cost methods for seed priming that do not employ mined materials. At present, there is no report of a compost product that generates adequate water potential and possesses sufficient water retention for commercial seed priming for significant durations beyond twenty-four hours.

SUMMARY OF THE INVENTION

Provided is a method for seed priming comprising the steps of treating seed with a seed priming composition comprising sieved compost, hydrogel and water in a ratio of sieved compost:hydrogel:water of from about 4:1:4.75 to about 9:1:11 by weight in an amount sufficient to result in priming of the seed. In preferred embodiments, the seed priming composition is substantially free of soil or sand. In further preferred embodiments, the seed is treated with the seed priming composition at a temperature of about 5° C. to about 25° C.

In some embodiments, the seed is treated with from about 2 to about 39 grams of the seed priming composition per gram of seed. In preferred embodiments, the seed is treated with from about 9 to about 39 grams of the seed priming composition per gram of seed. In further preferred embodiments, the water potential of said seed priming composition is from about −1.6 MPa to about −0.5 MPa. In some embodiments, the seed is vegetable seed, herb seed, wildflower seed, ornamental seed or grass seed. In further embodiments, the seed is celery, carrot, beet, onion, tomato, pepper, lettuce, snap bean, soybean, *Impatiens* sp., *Primula* sp., parsley, broccoli, Kentucky bluegrass, wildflower species, *Brassica napus*, and corn. In some embodiments, the wildflower species is New England aster (*Aster novae-angeliae* or *Symphyotrichum novae-angliae*), Dense Blazing star (*Liatris spicata*), Dame's Rocket (*Hesperis natronalis*), Perennial gaillardia (*Gaillardia aristata*), smooth blue aster (*Aster laevis* L.), purple coneflower (*Echinacea purpurea* (L.) Moench), Oxeye sunflower (*Heliopsis helianthoides* (L.) Sweet) or Butterfly weed (*Asclepias tuberosa*). In some embodiments, the seed is stored from about 7 to about 35 days after said contacting before being allowed to germinate.

Also provided is a seed priming composition comprising sieved compost, hydrogel and water in a ratio of sieved compost:hydrogel:water of from about 4:1:4.75 to about 9:1:11 by weight. In preferred embodiments, the water potential of the composition is from about −1.6 MPa to about −0.5 MPa. In preferred embodiments, the seed priming composition is substantially free of soil or sand.

Provided is a seed composition comprising seed and a seed priming composition according to the previous embodiments, wherein seed is blended with from about 2 to about 39 grams of the seed priming composition per gram of seed. In some embodiments, the seed is blended with from about 9 to about 39 grams of the seed priming composition per gram of seed. In preferred embodiments, the water potential of the seed priming composition is from about −1.6 MPa to about −0.5 MPa. In some embodiments, the seed is vegetable seed, herb seed, wildflower seed, ornamental seed or grass seed. In further embodiments, the seed is cucumber, lettuce, carrot, onion, melon, sweet corn, tomato, eggplant, pepper, bean, radish, squash, pea, flower, alfalfa or soybean. In preferred embodiments, the seed composition and the seed priming composition are substantially free of soil or sand.

Provided is a method for producing a seed priming composition comprising blending sieved compost with hydrogel and water in a ratio of sieved compost:hydrogel:water of from about 4:1:4.75 to about 9:1:11 by weight. In some embodiments, the hydrogel is first blended with the sieved compost to form a mixture thereof and the water is subsequently blended to the mixture. In preferred embodiments, the seed priming composition is substantially free of soil or sand.

Also provided is a method for producing a seed composition comprising blending sieved compost with hydrogel and water in a ratio of sieved compost:hydrogel:water of from about 4:1:4.75 to about 9:1:11 by weight, and blending seed to said seed priming composition, wherein seed is blended with from about 2 to about 39 grams of said seed priming composition per gram of seed. In some embodiments, the seed is blended with from about 9 to about 39 grams of the seed priming composition per gram of seed. In preferred embodiments, the seed composition and the seed priming composition are free of soil or sand. In further preferred embodiments, the seed is blended with the seed priming composition at a temperature of about 5° C. to about 25° C.

As envisioned in the present invention with respect to the disclosed compositions of matter and methods, in one aspect the embodiments of the invention comprise the components and/or steps disclosed therein. In another aspect, the embodiments of the invention consist essentially of the components and/or steps disclosed therein. In yet another aspect, the embodiments of the invention consist of the components and/or steps disclosed therein.

DEFINITIONS

As used herein, each of the following terms has the meaning associated with it in this section.

The articles "a" and "an" are used herein to refer to one or to more than one (i.e. to at least one) of the grammatical object of the article. By way of example, "an element" means one element or more than one elements.

The term "about" will be understood by persons of ordinary skill in the art and will vary to some extent depending on the context in which it is used. As used herein, "about" is meant to encompass variations of ±20% or ±10%, more preferably ±5%, even more preferably ±1%, and still more preferably ±0.1%.

The term "compost," as used herein, refers to organic matter that has been decomposed and recycled as fertilizer or soil amendment. The process of composting may vary in complexity. The most simple process of composting requires simply piling up waste outdoors and waiting a year or more for decomposition to occur. Composting can also involve more methodical steps and be a closely monitored process with measured inputs of water, air and carbon- and nitrogen-rich materials. The decomposition process is furthered by shredding the organic matter, adding water and ensuring proper aeration by regularly turning the mixture. However, contained, static, or turned-over composting processes can be used. Any completed composting process may be employed, including all natural or forced aeration composting processes. Compost can be rich in nutrients. In preferred embodiments, compost for use in the present application may be made with materials comprising arboretum plant refuse, garden weeds, leaf litter, turfgrass clippings and greenhouse plants with horticultural media. In preferred embodiments, plant waste and media are composted for at least nine weeks in outdoor windrows with interior temperatures reaching 56-77° C. In preferred embodiments, windrows are turned three times during the composting stage. In further embodiments, sterilization or heat treatment is employed to rid the soil or compost of unwanted pathogens. In further preferred embodiments, final compost processing consists of heating in a SS60R electric soil sterilizer (Pro-Grow Supply, Brookfield, Wis., USA) at 82° C. for 40 minutes.

The term "sieved compost," as used herein, refers to compost that has been sieved through a 1-cm screen or finer screen to remove larger particles while retaining materials that pass through the sieve. In preferred embodiments, the compost is further sieved, e.g., by a further passage through a finer mesh size, e.g., a 0.5 mm sieve or smaller.

The term "hydrogel," as used herein, refers to a composition comprising a network of polymer chains that are hydrophilic. Hydrogels comprise natural or synthetic polymers that are highly water adsorbent and can absorb over 99.9% water, by weight. In preferred embodiments hydrogel is a polyacrylamide polymer such as acrylamide potassium acrylate polymer, e.g. Supersorb F® (Aquatrols corp.) CAS No. 31212-13-2. In some embodiments, this hydrogel comprises polyvinyl alcohol, sodium polyacrylate, or acrylate polymer and copolymers with an abundance of hydrophilic groups. In some embodiments, the hydrogel is a propenoate-propenamide copolymer. The hydrogel can also be derived from starch or other natural polymers.

The term "water potential," as used herein, refers to the difference in potential energy between pure water and the water in some system. (Gurevitch, J., S. M. Scheiner, and G. A. Fox. 2006. The ecology of plants. $2^{nd}$ ed. Sinauer Associates, Inc., Sunderland, Mass., USA.) Water potential is the potential energy of water per unit volume relative to pure water in reference conditions. Water potential quantifies the tendency of water to move from one area to another due to osmosis, gravity, mechanical pressure, or matrix effects such as surface tension. In preferred embodiments, water potential quantifies the tendency of water to move from one area to another due to osmosis. The addition of solutes to water lowers the water's potential (makes it more negative). An increase in pressure increases the water's potential (makes it more positive). Water has a tendency to move from areas of higher water potential to areas of lower water potential. Water potential, as used herein, is measured in the pressure unit megapascal (MPa=1 million Pa), where pascal (Pa) is one Newton per square meter.

The term "seed priming," as used herein, refers to a treatment of seed before sowing which allows seed germination processes to begin by partially hydrating seed but at sufficiently low water potentials such that radicle emergence does not occur. Seed are typically dried back to their dry state after the priming procedure. Priming may be conducted using an aqueous solution or a solid matrix. In preferred embodiments, priming is conducted using a seed priming composition comprising sieved compost, hydrogel and water. In preferred embodiments, the seed is treated with the seed priming composition at a temperature of about 5° C. to about 25° C. In further preferred embodiments, the seed priming composition is substantially free of soil or sand. By "substantially free of" soil or sand is meant that the sieved compost comprises less than about 20% by weight of sand or soil. More preferably, the sieved compost comprises less than about 10%, less than about 5%, or less than about 1%, by weight, of sand or soil.

DETAILED DESCRIPTION OF THE INVENTION

Provided is a seed priming composition and method which is environmentally friendly. Seed priming matrices generally comprise mined materials, such as Agro-Lig®, a dry ground formulation of Leonardite shale. The seed priming composition disclosed herein is non-mined and therefore may be produced at low cost. One of the main advantages of the seed priming composition disclosed herein is that it is renewable and environmentally friendly. At present there is no compost product that generates adequate water potential and possesses sufficient water retention for seed priming for significant durations beyond twenty-four hours. The seed priming composition described herein has defined water characteristics and retentive abilities. The seed priming composition disclosed herein possesses sufficient water retention for seed priming for up to about 21 days.

Compost

The compost for use in the present application may be made with materials comprising, for example, arboretum plant refuse, garden weeds, leaf litter, turfgrass clippings and greenhouse plants with horticultural media. According to exemplary, non-limiting composting methods, plant waste and media are composted for at least nine weeks in outdoor windrows with interior temperatures reaching 56-77° C. Windrows are turned three times during the composting stage. Final compost processing may consist of heating in a SS60R electric soil sterilizer (Pro-Grow Supply, Brookfield, Wis., USA) at 82° C. for 40 minutes. Composted materials are sieved through a 1-cm screen and materials passing through the sieve are retained for analysis while larger particles are removed. Finished compost product may be stored in non-sealed plastic-lined boxes for 6 months prior to use. The compost may then be passed through a 0.5 mm sieve.

Hydrogel

The hydrogel for use in the present application may be commercially available polyacrylamide hydrogel such as SuperSorb F®. Examples of other polyacrylamide and related materials comprise Agrosoke® (Agrosoke, Fort Worth, Tex.), AquaLox-Lox® (Soil Tech, Fort Worth, Tex.), Broadleaf P-4® (Broadleaf Industries, San Diego), Supersorb C® (Aquatrols Corp. of America, Pennsauken, N.J.), and Terra-Sorb® (Industries Services Intl., Bradenton, Fla.). Other hydrogels such as those derived from industrial waste (Andry, H., T. Yamamoto, T. Irie, S. Moritani, M. Inoue, and H. Fujiyama. 2009. *J. Hydrology* 373:177-183) or starch, may also be used. Examples of starch-based materials comprise Liqua-Gel® (Miller Chemical Processing Corp., Hanover, Pa.), Water-Lock B-204® (Grain Processing Corp., Musscatine, Id.), and Sta-Wet® (Polysorb, Smelterville, Id.). Other hydrogels that may be used comprise propenoate-propenamide copolymers such as Viterra® (Nepera Chemical Co., Harriman, N.Y.).

Seed Priming Composition

Provided is a seed priming composition comprising sieved compost, hydrogel and water in a ratio of sieved compost:hydrogel:water as described above. In some embodiments, the seed priming composition must be sufficiently friable and nonclumping so as to prevent saturation due to the presence of excess hydrogel. The ratio of hydrogel relative to that of compost or water can be modulated as long as the composition remains flowable. (See Table 1 below)

TABLE 1

Flowability of the seed priming composition (by weight in grams)

| Sieved compost | Hydrogel | Distilled water | Ratio of sieved compost:hydrogel:water | Flowability |
| --- | --- | --- | --- | --- |
| 13.5 | 1.5 | 11.25 | 9:1:7.5 | Flowable |
| 12.5 | 2.5 | 14.25 | 5:1:5.7 | Flowable |
| 12.0 | 3.0 | 14.25 | 4:1:4.75 | Flowable |

TABLE 1-continued

Flowability of the seed priming composition (by weight in grams)

| Sieved compost | Hydrogel | Distilled water | Ratio of sieved compost:hydrogel:water | Flowability |
| --- | --- | --- | --- | --- |
| 11.5 | 3.5 | 14.25 | 3.29:1:4.07 | Not flowable |
| 11.0 | 4.0 | 14.25 | 2.75:1:3.56 | Not flowable |
| 10.0 | 5.0 | 11.25 | 2:1:2.25 | Not flowable |

In preferred embodiments, the water potential of the composition is from about −1.6 MPa to about −0.5 MPa. In yet further preferred embodiments, the water potential of the composition is about −1.0 MPa.

Provided is a method for producing a seed priming composition comprising blending sieved compost with hydrogel and water in a ratio of sieved compost:hydrogel:water in ratios as described above. In some embodiments, the hydrogel is first blended with the sieved compost to form a mixture thereof and the water is subsequently blended to the mixture. The ratio of hydrogel relative to that of compost or water can be increased as long as the composition remains flowable (See Table 1)

Seed Composition

Provided is a seed composition comprising seed and a seed priming composition, as described above. In preferred embodiments, the water potential of the seed priming composition is from about −1.6 MPa to about −0.5 MPa. In yet further preferred embodiments, the water potential of the seed priming composition is about −1.0 MPa.

Also provided is a method for producing a seed composition comprising the method for producing a seed priming composition further comprising blending seed to the seed priming composition, as described above.

The seed can be virtually any seed, including most vegetable crops, ornamentals and agronomic crops. In some embodiments, the seed is vegetable seed, herb seed, wildflower seed, ornamental seed or grass seed. In further embodiments, the seed is cucumber, lettuce, carrot, onion, melon, sweet corn, tomato, eggplant, pepper, bean, radish, squash, pea, flower, alfalfa or soybean.

The seed composition or the seed priming composition described supra can also advantageously contain prescribed amounts of known seed fungicides such as thiram, captan, metalaxyl, pentachloronitrobenzene, and fenaminosuf, so that the finished primed seed is coated with the desired amount of fungicide, as is known to those skilled in the art.

The seed can also be treated with insecticides, pesticides or bactericides in addition to or in place of fungicides, after priming.

Seed Storage and Germination

Seeds may be stored after priming and drying. For seed storage, approximately 0.5 g seed is contained within 15×33-cm polyethylene bag No. 21 (Seedburo Co., Chicago, Ill., USA) and heat-sealed with a Model 210-8G Impulse Bag Sealer (Clamco Corp., Cleveland, Ohio, USA). Sealed bags with primed seed are stored at 3° C. or 20-30° C. (16-8 h) in darkness from about 7 to about 35 days and germination may be subsequently evaluated.

Germination tests may be conducted to determine the effect on seed germination of priming with the seed priming composition disclosed herein. For germination tests, seeds are incubated on two layers of germination No. 385 blotters (Seedburo Co., Chicago, Ill., USA) moistened with 20 mL of distilled water contained in 125×80×20-mm transparent polystyrene boxes with tight-fitting lids for 14 d at 20-30° C. (16-8 h) in darkness. Duration of testing and germination temperature are preferably those recommended by the International Seed Testing Association (2010). Additional distilled water is added to maintain blotter moisture throughout germination.

EXAMPLES

Example 1

Preparation of a Composition for Seed Priming

Plant and organic media waste was collected from the Landscape Arboretum of Temple University (Ambler, Pa., USA) and composted according to Olszewski, M. W., T. A. Trego, and R. Kuper. 2009b. *Compost Sci. Util.* 17:151-157. The compost was made with materials originating from arboretum plant refuse, garden weeds, leaf litter, turfgrass clippings and greenhouse plants with horticultural media. Plant waste and media were composted for at least nine weeks in outdoor windrows with interior temperatures reaching 56-77° C. Windrows were turned three times during the composting stage. Final compost processing consisted of heating in a SS60R electric soil sterilizer (Pro-Grow Supply, Brookfield, Wis., USA) at 82° C. for 40 minutes. All composted materials were sieved through a 1-cm screen and materials passing through the sieve are retained for further testing while larger particles are removed. Finished compost product was stored in non-sealed plastic-lined boxes prior to use.

This material was screened through a 0.5 mm sieve and compost chemical analysis was determined (Table 2). Analyses of the compost determined that it had a 13:1 C:N ratio and was stable over time (Table 2). Sieved compost was used for all subsequent experiments. Sieved compost was of low nutrient status and had an electrical conductivity of 2.38 dS cm$^{-1}$.

TABLE 3

WP-4 Dewpoint PotentiaMeter (Decagon Devices, Inc., Pullman, Washington, USA) osmotic measurements of filtered sieved compost leachate. Estimation of osmotic forces exerted by sieved compost.

| Replicate No. | Osmotic potential |
|---|---|
| 1 | 0.00 MPa |
| 2 | −0.02 MPa |
| 3 | −0.01 MPa |

Hydrogel (SuperSorb-F®, Aquatrols Corp., Paulsboro, N.J., USA) was obtained commercially. Sieved compost (12.5 or 15.0 g) was blended with the hydrogel (0 or 2.5 g) and distilled water (0 to 26.25 g) to form a seed priming composition. Materials were blended and equilibrated for 24 h prior to testing. Water potentials were determined using a WP-4 Dewpoint PotentiaMeter (Decagon Devices, Inc., Pullman, Wash., USA). Water content (WC) was expressed as percent dry weight using the following formula: Seed priming composition, % WC={[(wet weight of seed priming composition)−(dry weight of seed priming composition)]/dry weight of seed priming composition} multiplied by 100. Water content was determined by oven drying 4.0 to 4.3 g of seed priming composition at 105° C. for a minimum of 16 h. Three replicates were used to generate each datapoint.

For the following experiments, the seed priming composition for seed priming consisted of 5:1:5.7 sieved compost:hydrogel:distilled water (based on weight) equaling a water potential of −1.0 MPa. Osmotic effects of sieved compost was determined by filtering an extract (1 part sieved compost plus 4 parts distilled water) followed by water potential determination similar to Taylor, A. G., D. E. Klein, and T. H. Whitlow. 1988. SMP:solid matrix priming of seeds. *Scientia Hort.* 37:1-11.

Results:
Compared to Agro-Lig®, a dry ground formulation of Leonardite shale, the sieved compost used above has higher

TABLE 2

Sieved compost analyses including pH, electrical conductivity (EC), nitrate-nitrogen ($NO_3$—N), ammonium-nitrogen ($NH_4$—N), phosphorous (P), potassium (K), calcium (Ca), magnesium (Mg), iron (Fe), manganese (Mn), boron (B), copper (Cu), zinc (Zn), molybdenum (Mo), sodium (Na), aluminum (Al), sulfur (S), carbon (C), nitrogen (N), and C:N ratio.

| Medium[1] | pH | EC (mS · cm$^{-1}$) | $NO_3$—N | $NH_4$—N | P | K | Ca | Mg | Fe | Mn |
|---|---|---|---|---|---|---|---|---|---|---|
| | | | | | ppm | | | | | |
| Sieved compost[2] | 6.7 ± 0.04[3] | 2.38 ± 0.02 | 101 ± 0 | 86 ± 1 | 6 ± 0.03 | 165 ± 13 | 243 ± 3 | 77 ± 1 | 1.8 ± 0.2 | 0.1 ± 0.04 |
| Normal Ranges[2] | 5.3 to 6.2 | 0.76 to 2.50 | 40 to 200 | 0 to 30 | 5 to 30 | 40 to 200 | 40 to 200 | 28 to 80 | 0.3 to 3.0 | 0.1 to 3.0 |

| Medium[1] | B | Cu | Zn | Mo | Na | Al | S | C | N | C:N ratio |
|---|---|---|---|---|---|---|---|---|---|---|
| | | | ppm | | | | | % | | |
| Sieved compost[2] | 0.5 ± 0.02 | 0.2 ± 0.006 | 0.08 ± 0.03 | 0.03 ± 0.04 | 11 ± 0.04 | 2.6 ± 0.4 | 0.06 ± 0.007 | 10.06 ± 0.19 | 0.73 ± 0 | 13 ± 0 |
| Normal Ranges[2] | 0.05 to 0.5 | 0.01 to 0.3 | 0.1 to 0.3 | 0.01 to 0.1 | — | — | — | — | — | — |

[1]Compost was from plant and organic media waste materials screened through a 0.5 mm sieve prior to analysis.
[2]Values and normal ranges were determined by Micro-Macro International (Athens, Georgia, USA).
[3]Mean ± standard deviation, N = 2.

The osmotic potential of filtered sieved compost leachate was measured using a WP-4 Dewpoint PotentiaMeter (Decagon Devices, Inc., Pullman, Wash., USA). The results are shown in Table 3.

concentrations of K and P but lower concentrations of N, Ca, Mg, Na, Fe, Mn, and Zn (Table 2). The sieved compost had low C:N ratio (13:1) and had low nutrient status except for ammonium-nitrogen and calcium, which were slightly above normal in concentration. Compost pH was slightly higher (pH=6.7) than typical ranges for horticultural media. Since most seed germinate over a wide pH range, pH likely had no or minimal effect on seed during priming. Although the electrical conductivity of sieved compost was 2.38 mS·cm$^{-1}$, testing of compost leachate indicated that there was no significant contribution of osmotic potential to the overall water potential.

Figure 1:
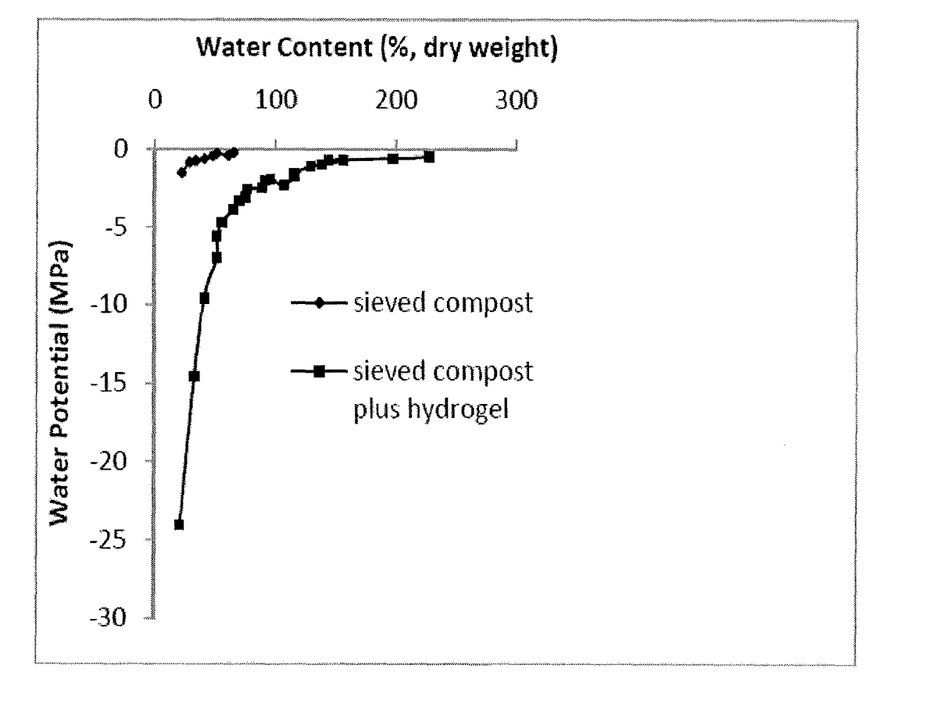
FIG. 1 illustrates moisture release curves for sieved compost (♦) and a seed priming composition comprising sieved compost plus hydrogel and water (■), showing water potential (MPa) versus water content (% dry weight basis).

Water release curves for the sieved compost plus distilled water and for sieved compost and hydrogel plus distilled water were determined (FIG. 1). Water potentials of −24.1 to −0.5 MPa with water content of 21.5 to 227.9% were generated with sieved compost and hydrogel with distilled water. This seed priming composition was flowable and met other requirements for a solid matrix system such as a low water potential and sufficient water retention. Some other ideal characteristics that were met by the seed priming composition were negligible water solubility, a high surface area, nontoxicity to the seed, and the ability to adhere to the seed surface. By blending 5:1:5.7 sieved compost:hydrogel:distilled water, we were able to generate adequate water content (138%, dry weight basis) and water potential (−1.0 MPa) for carrot seed priming. Although compost alone with distilled water generated low water potential (−1.5 to −0.2 MPa) the water content was too low (22.6 to 65.6%) for solid matrix priming.

TABLE 4

Water potentials with fixed seed priming composition blends.

| Sieved compost (g) | Hydrogel (g) | Distilled Water (g) | Water potential (MPa)/Water content (% dry wt) | Ratio |
|---|---|---|---|---|
| 12.5 | 2.5 | 0.00 | −24.07/22 | 5:1:0 |
| 12.5 | 2.5 | 11.25 | −1.64/115 | 5:1:4.5 |
| 12.5 | 2.5 | 14.25 | −0.99/138 | 5:1:5.7 |
| 12.5 | 2.5 | 16.25 | −0.70/144 | 5:1:6.5 |
| 12.5 | 2.5 | 26.25 | −0.53/228 | 5:1:10.5 |
| 13.5 | 1.5 | 11.25 | −0.93/87 | 9:1:7.5 |
| 13.5 | 1.5 | 14.25 | −0.70/113 | 9:1:9.5 |
| 15.0 | 0.0 | 0.00 | −1.53/23 | N/A |
| 15.0 | 0.0 | 5.25 | −0.21/66 | 2.9:0:1 |

Example 2

Preparation of a Composition Comprising Seed and a Composition for Seed Priming

Carrot seed lots (single mericarps mixed with schizocarps) of 'Danvers Half Long' and 'Nantes Scarlet' were obtained commercially and both had a labeled germination of 80%. Seeds were treated with a seed priming composition comprising 5:1:5.7 sieved compost and hydrogel plus distilled water (based on weight) within 125×80×20 mm transparent polystyrene boxes containing 70 g of seed priming composition and seed and incubated at 15° C. for 7 days in darkness. Seeds were mixed with the seed priming composition at ratios of 1:10, 1:20, 1:30, or 1:40 (seed weight:total weight of seed and seed priming composition). The seeds and seed priming composition were mixed together by stirring. The polystyrene box lids were sealed with Parafilm (Pechiney Plastic Packaging, Menasha, Wis., USA) prior to solid matrix priming. Polyethylene glycol (PEG) 8000 priming was by aerated solutions containing 4 g seed and 80 mL of PEG solution within a flask sealed with Parafilm. The aerated PEG solutions initially equaled −1.0 MPa according to calculations incorporating concentration and temperature (Michel, B. E. and M. R. Kaufmann. 1973. *Plant Physiol.* 51:914-916). Following priming, seeds were washed in running water to remove PEG and water potentials of all priming agents were determined using a WP-4 PotentiaMeter. All seeds were dried with airflow for 1 week prior to germination testing.

Seed Storage and Germination Tests

Following the above priming plus drying procedures, a seed storage study was conducted. Seeds primed at a priming ratio of 1:30 (seed weight:total weight of seed and seed priming composition) was chosen for the storage study based on optimal germination responses determined in the previous experiment. For seed storage, approximately 0.5 g seed was contained within 15×33-cm polyethylene bag No. 21 (Seedburo Co., Chicago, Ill., USA) and heat-sealed with a Model 210-8G Impulse Bag Sealer (Clamco Corp., Cleveland, Ohio, USA). Sealed bags with primed seed were stored at 3° C. or 20-30° C. (16-8 h) in darkness for 7 or 35 days and germination subsequently evaluated.

For germination tests, seeds were incubated on two layers of germination No. 385 blotters (Seedburo Co., Chicago, Ill., USA) moistened with 20 mL of distilled water contained in 125×80×20-mm transparent polystyrene boxes with tight-fitting lids for 14 days at 20-30° C. (16-8 h) in darkness. Duration of testing and germination temperature were those recommended by the International Seed Testing Association (2010). Additional distilled water was added to maintain blotter moisture throughout germination testing. Nonprimed seeds were included as a control. Each polystyrene box contained 50 seeds. There were four replications (boxes) per treatment arranged in a completely randomized block design. The number of seeds that germinated (those having a visible radicle) were counted daily and removed. From these counts, final germination percentage (FGP) and its angular transformation (arcsin square root % transformation in degrees [deg.]; Gomez, K. A. and A. A. Gomez. 1984. Statistical procedures for agricultural research. 2$^{nd}$ ed. Wiley, N.Y.), days to 10% FGP and days to 50% FGP ($G_{10}$ and $G_{50}$, respectively) were subjected to analysis of variance (ANOVA) using PROC GLM (SAS 9.1; SAS Institute, Inc., Cary, N.C.). Using an equation (Olszewski et al., 2009a), $G_{10}$ and $G_{50}$ were calculated: $G_x = N + [((Y \times TSG) - SG_N)/(SG_{N+1} - SG_N)]$; where, $G_x$ is $G_{10}$ or $G_{50}$; N equals the number of the last day after initiation of the germination assay with <10 or 50% of final germination, respectively, for $G_{10}$ or $G_{50}$; Y equals 0.1 or 0.5, respectively, for $G_{10}$ or $G_{50}$; TSG equals total number of seeds germinated; $SG_N$ equals the number of seed germinated by day N, and; $SG_{N+1}$ equals the number of seeds germinated by day N+1.

Results:

Seeds of all priming treatments germinated faster (lower $G_{10}$ and/or $G_{50}$) than nonprimed seeds (Table 5). Proportions of seed-to-seed priming composition may impact priming. The ratio of seed-to-seed priming composition did not affect 'Nantes Scarlet' germination rate but, for 'Danvers Half Long' carrot, a ratio of 1:10 resulted in slower germination (higher $G_{10}$ or $G_{50}$ values) than ratios of 1:20, 1:30, or 1:40. A seed-to-seed priming composition ratio of 1:30 resulted in the lowest $G_{50}$ value for 'Danvers Half Long' carrot. Seed primed with seed priming composition subjected to all tested seed-to-seed priming composition ratios (1:10, 1:20, 1:30, or 1:40) germinated more rapidly than PEG-primed seed. Although 'Nantes Scarlet' FGP was greater for 1:30 seed priming composition primed (FGP=85%) than PEG primed (FGP=72%) seeds, in general, altering the ratio of seed-to-seed priming composition had no effect on FGP for either cultivar.

In the study, the final water potential of PEG priming solutions with 'Danvers Half Long' seed was −1.3 MPa and of 'Nantes Scarlet' seed was −6.0 MPa while 1:30 seed:seed priming composition had a water potential of −1.0 MPa for both cultivars following priming for 7 days with the seed priming composition. This indicates that PEG solutions require replacement within the 7 day priming period while the compost-based solid seed priming composition maintained uniform water potential.

All seed primed with the above seed priming composition and subsequently stored germinated more rapidly than non-primed carrot seed (Table 6). There was no difference in FGP between nonprimed seed or seed primed with seed priming composition and subsequently stored in the test of 'Danvers Half Long' carrot seed. Compared to nonprimed seeds, FGP of 'Nantes Scarlet' carrot seed primed with 5:1:5.7 sieved compost:hydrogel:distilled water increased following 7 or 35 days at 3° C. or 35 d at 20-30° C. (16-8 h); however, there were no FGP differences among seed priming composition treatments. Values of $G_{10}$ or $G_{50}$ for 'Nantes Scarlet' carrot seed increased with higher storage temperature, indicating that seed primed with the seed priming composition may benefit from storage at low temperature.

Generally, results indicated that primed carrot seed could be stored without loss of germination benefit. Carrot seeds primed with the seed priming composition could be dried and

TABLE 5

Final germination percentage (FGP) and its angular transformation (deg.), days to 10% of FGP ($G_{10}$), and days to 50% of FGP ($G_{50}$) of 'Danvers Half Long' and 'Nantes Scarlet' carrot following seed priming composition priming at −1.0 MPa or polyethylene glycol (PEG) priming at −1.0 MPa for 7 d at 15° C. in darkness. Seed were incubated at 20-30° C. (16-8 h) in darkness during germination testing.[1]

|  | Carrot Cultivar | | | | | |
| --- | --- | --- | --- | --- | --- | --- |
|  | Danvers Half Long | | | Nantes Scarlet | | |
| Seed hydration Treatment | FGP % (deg.) | $G_{10}$ (d) | $G_{50}$ (d) | FGP % (deg.) | $G_{10}$ (d) | $G_{50}$ (d) |
| Nonprimed (control) | 79 (63) | 2.5 | 3.4 | 74 (59) | 2.7 | 3.8 |
| PEG primed | 80 (63) | 1.8 | 2.7 | 72 (58) | 2.3 | 3.5 |
| Seed priming composition primed | | | | | | |
| 1:10[2] | 75 (60) | 0.8 | 1.6 | 80 (64) | 1.2 | 1.8 |
| 1:20 | 74 (60) | 0.2 | 1.6 | 77 (61) | 1.0 | 1.6 |
| 1:30 | 80 (64) | 0.2 | 0.9 | 85 (67) | 1.1 | 1.6 |
| 1:40 | 77 (61) | 0.3 | 1.2 | 76 (61) | 1.1 | 1.7 |
| $LSD_{0.05}$ | (6) | 0.3 | 0.2 | (8) | 0.2 | 0.2 |

[1]Seeds were dried back prior to germination testing.
[2]Ratios of 1:10, 1:20, 1:30, and 1:40 equivalent to 1 part seed plus 9, 19, 29, and 39 parts seed priming composition, respectively (wt:wt basis).
deg. = angular transformation of mean;
PEG = polyethylene glycol;
$LSD_{0.05}$ = Fisher's protected least significant difference.
Statistical program used was SAS version 9.1

Priming of carrot using 5:1:5.7 sieved compost:hydrogel:distilled water did not result in loss of germination benefit when seed were dried back.

stored for 35 days at 3 or 20-30° C. (16-8 h) for 'Danvers Half Long' and for 35 days at 3° C. for 'Nantes Scarlet' with no loss in priming benefit.

TABLE 6

Final germination percentage (FGP) and its angular transformation (deg.), days to 10% FGP ($G_{10}$), and days to 50% FGP ($G_{50}$) for 'Danvers Half Long' and 'Nantes Scarlet' carrot following priming with seed priming composition (−1.0 MPa for 7 days at 15° C. in darkness) and storage for 7 or 35 d at 3 or 20-30° C. (16-8 h). Seed were incubated at 20-30° C. (16-8 h) in darkness during germination testing.[1]

| Seed storage conditions | | Carrot Cultivar | | | | | |
| --- | --- | --- | --- | --- | --- | --- | --- |
| | | Danvers Half Long | | | Nantes Scarlet | | |
| Temperature (° C.) | Duration (days) | FGP % (deg.) | $G_{10}$ (days) | $G_{50}$ (days) | FGP % (deg.) | $G_{10}$ (days) | $G_{50}$ (days) |
| Nonprimed (control) | | 78 (62) | 2.2 | 3.0 | 68 (55) | 2.7 | 3.7 |
| Seed priming composition-primed (nonstored) | | 74 (59) | 0.2 | 0.8 | 72 (59) | 0.7 | 1.5 |

TABLE 6-continued

Final germination percentage (FGP) and its angular transformation (deg.), days to 10% FGP ($G_{10}$), and days to 50% FGP ($G_{50}$) for 'Danvers Half Long' and 'Nantes Scarlet' carrot following priming with seed priming composition (−1.0 MPa for 7 days at 15° C. in darkness) and storage for 7 or 35 d at 3 or 20-30° C. (16-8 h). Seed were incubated at 20-30° C. (16-8 h) in darkness during germination testing.[1]

|  |  | Carrot Cultivar | | | | | |
| --- | --- | --- | --- | --- | --- | --- | --- |
| Seed storage conditions | | Danvers Half Long | | | Nantes Scarlet | | |
| Temperature (° C.) | Duration (days) | FGP % (deg.) | $G_{10}$ (days) | $G_{50}$ (days) | FGP % (deg.) | $G_{10}$ (days) | $G_{50}$ (days) |
| Seed priming composition-primed (stored) | | | | | | | |
| 3 | 7 | 78 (62) | 0.3 | 1.2 | 82 (65) | 0.7 | 1.5 |
| 3 | 35 | 78 (62) | 0.1 | 0.6 | 81 (64) | 0.7 | 1.5 |
| 20-30 | 7 | 83 (65) | 0.4 | 1.4 | 76 (61) | 1.0 | 1.7 |
| 20-30 | 35 | 78 (62) | 0.2 | 0.8 | 80 (64) | 1.1 | 1.7 |
| $LSD_{0.05}$ | | (7) | 0.1 | 0.2 | (6) | 0.3 | 0.1 |

[1]Seeds were primed at a seed-to-seed priming composition ratio of 1:30 (1 part seed:29 parts seed priming composition). Seed were dried back prior to storage and germination testing.
$LSD_{0.05}$ = Fisher's protected least significant difference;
deg. = angular transformation of mean. Statistical program used was SAS version 9.1

Marsh blazing star (*Liatris spicata* (L.) Willd.) and smooth blue aster (*Aster laevis* L.) germinated faster (lowered G50) and with a higher germination percentage after priming with seed priming composition (Table 7).

TABLE 7

Influence of sieved compost-hydrogel priming (15° C. for 9 days in darkness) on wildflower seed germination. Seeds were dried back prior to germination tests.

| Seed:seed priming composition | Water Potential (MPa) | Marsh blazing star | Smooth blue aster |
| --- | --- | --- | --- |
| | | Final germination percentage [% (deg.)] | |
| 1 part seed:5 parts seed priming composition | −0.5 | 53 (47) bc | 39 (39) b |
| | −1.0 | 61 (52) ab | 50 (45) a |
| 1 part seed:29 parts seed priming composition | −0.5 | 66 (54) a | 43 (41) ab |
| | −1.0 | 67 (55) a | 52 (46) a |
| Nonprimed seeds (raw seed control) | | 47 (43) c | 37 (37) b |
| | | G50 (days) | |
| 1 part seed:5 parts seed priming composition | −0.5 | 7.2 bc | 6.4 b |
| | −1.0 | 7.5 bc | 5.8 b |
| 1 part seed:29 parts seed priming composition | −0.5 | 6.9 c | 6.7 ab |
| | −1.0 | 7.9 b | 6.9 ab |
| Nonprimed seeds (raw seed control) | | 10.2 a | 8.6 a |

LSD: least significant difference (0.05).
(deg.) = arcsine square root transformation of percentage data
Statistical program used was SAS version 9.1
Seeds were germinated at 20-30° C. using a 14 h incubation period at 20° C. in darkness and an 10 h incubation period at 30° C. in light.

Example 3

Common milkweed (*Asclepias syriaca* L.) seed was pre-chilled for 3 weeks between blotters at 5° C. For some common milkweed seed, prechilling was substituted with priming with 5:1:5.7 sieved compost:hydrogel:distilled water seed priming composition for 21 days at −1.0 MPa. Both treatments similarly increased final germination percentage and decreased days to 50% germination (G50). The results of the priming experiments are shown in Table 8.

TABLE 8

Priming of common milkweed with seed priming composition for up to 21 days at −0.5 (5:1:10.5 sieved compost:hydrogel:distilled water) or −1.0 MPa (5:1:5.7 sieved compost:hydrogel:distilled water) at 5° C. in darkness. Seeds were dried back prior to germination tests.

| Duration (days) | Water potential (MPa) | Common Milkweed FGP [% (deg.)] | Common Milkweed G50 (days) |
| --- | --- | --- | --- |
| 7 | −0.5 | 62 (52) d | 3.7 c |
| 21 | −0.5 | 76 (61) bc | 3.1 c |
| 7 | −1.0 | 67 (55) d | 3.8 bc |
| 21 | −1.0 | 81 (64) ab | 3.5 c |
| Between 2 blotters for 7 d | | 70 (57) cd | 4.5 ab |
| Between 2 blotters for 21 d | | 84 (67) a | 3.6 c |
| Nonprimed seeds (raw seed control) | | 29 (33) e | 5.2 a |

LSD: least significant difference (0.05)
(deg.) = arcsine square root transformation of percentage data
Statistical program used was SAS version 9.1
Seeds were germinated at 20-30° C. using a 14 h incubation period at 20° C. in darkness and an 10 h incubation period at 30° C. in light.

What is claimed is:

1. A method for seed priming comprising:
   treating seed before sowing with a flowable seed priming composition comprising sieved compost, hydrogel and water in a ratio of sieved compost:hydrogel:water of from about 4:1:4.75 to about 9:1:11 by weight in an amount sufficient to result in priming of said seed, whereby seed germination begins by partial seed hydration but at sufficiently low water potentials such that radicle emergence does not occur.

2. The method of claim 1 wherein said seed is treated with from about 2 to about 39 grams of said seed priming composition per gram of seed.

3. The method of claim 2 wherein said seed is treated with from about 9 to about 39 grams of said seed priming composition per gram of seed.

4. The method of claim 1 wherein the water potential of said seed priming composition is from about −1.6 MPa to about −0.5 MPa.

5. The method of claim 1 wherein said seed is vegetable seed, herb seed, wildflower seed, ornamental seed or grass seed.

6. The method of claim 5 wherein said seed is celery, carrot, beet, onion, tomato, pepper, lettuce, snap bean, soybean, *Impatiens* sp., *Primula* sp., parsley, broccoli, Kentucky bluegrass, wildflower species, *Brassica napus*, or corn.

7. The method of claim 1 wherein said seed is stored from about 7 to about 35 days after said treatment before being allowed to germinate.

8. A flowable seed priming composition to be applied to seed before sowing to effectively allow germination of the seed to begin by partial hydration of the seed, but at sufficiently low water potentials such that radicle emergence does not occur, said priming composition comprising sieved compost, hydrogel and water in a ratio of sieved compost:hydrogel:water of from about 4:1:4.75 to about 9:1:11 by weight.

9. The composition of claim 8 wherein the water potential of the composition is from about −1.6 MPa to about −0.5 MPa.

10. A seed composition comprising seed and a flowable seed priming composition according to claim 8, wherein seed is blended with from about 2 to about 39 grams of said seed priming composition per gram of seed.

11. The seed composition of claim 10 wherein said seed is blended with from about 9 to about 39 grams of said seed priming composition per gram of seed.

12. The seed composition of claim 10 wherein the water potential of said seed priming composition is from about −1.6 MPa to about −0.5 MPa.

13. The seed composition of claim 10 wherein said seed is vegetable seed, herb seed, wildflower seed, ornamental seed or grass seed.

14. The seed composition of claim 13 wherein said seed is cucumber, lettuce, carrot, onion, melon, sweet corn, tomato, eggplant, pepper, bean, radish, squash, pea, flower, alfalfa or soybean.

15. A method for producing a flowable seed priming composition to be applied to seed before sowing to effectively allow germination to begin in the seed by partial hydration of the seed, but at sufficiently low water potentials such that radicle emergence does not occur, said method comprising:
   blending sieved compost with hydrogel and water in a ratio of sieved compost:hydrogel:water of from about 4:1:4.75 to about 9:1:11 by weight, to provide said flowable seed priming composition.

16. The method of claim 15 wherein the hydrogel is first blended with the sieved compost to form a mixture thereof and the water is subsequently blended to said mixture.

17. A method for producing a seed composition comprising:
   blending sieved compost with hydrogel and water in a ratio of sieved compost:hydrogel:water of from about 4:1:4.75 to about 9:1:11 by weight to provide a flowable seed priming composition; and
   blending seed to said flowable seed priming composition, wherein seed is blended with from about 2 to about 39 grams of said seed priming composition per gram of seed before sowing, to effectively allow seed germination to begin by partial hydration of the seed, but at sufficiently low water potentials such that radicle emergence does not occur.

* * * * *